(12) United States Patent (10) Patent No.: US 8,194,081 B2
Marggraff et al. (45) Date of Patent: Jun. 5, 2012

(54) ANIMATION OF AUDIO INK

(75) Inventors: Jim Marggraff, Lafayette, CA (US); Tracy L. Edgecomb, Berkeley, CA (US); Andy Van Schaack, Nashville, TN (US)

(73) Assignee: Livescribe, Inc., Oakland, CA (US)

( * ) Notice: Subject to any disclaimer, the term of this patent is extended or adjusted under 35 U.S.C. 154(b) by 1012 days.

(21) Appl. No.: 12/129,538

(22) Filed: May 29, 2008

(65) Prior Publication Data

US 2009/0027400 A1 Jan. 29, 2009

Related U.S. Application Data

(60) Provisional application No. 60/940,667, filed on May 29, 2007.

(51) Int. Cl.
*G06T 13/00* (2011.01)
*G06F 3/033* (2006.01)
*G06K 9/18* (2006.01)

(52) U.S. Cl. .......................... 345/473; 345/179; 382/186

(58) Field of Classification Search .................. 345/179, 345/473; 382/186, 189; 715/203, 268, 863
See application file for complete search history.

(56) References Cited

U.S. PATENT DOCUMENTS

| | | | | |
|---|---|---|---|---|
| 5,664,216 A * | 9/1997 | Blumenau | ...................... | 715/234 |
| 5,666,438 A * | 9/1997 | Beernink et al. | .............. | 382/189 |
| 5,818,436 A * | 10/1998 | Imai et al. | .................... | 715/203 |
| 6,215,901 B1 * | 4/2001 | Schwartz | ...................... | 382/186 |
| 6,404,856 B1 * | 6/2002 | Wilcox et al. | ................. | 379/67.1 |
| 6,529,920 B1 * | 3/2003 | Arons et al. | ................... | 715/268 |
| 7,175,095 B2 | 2/2007 | Pettersson et al. | | |
| 7,281,664 B1 | 10/2007 | Thaeler et al. | | |
| 2002/0163548 A1 * | 11/2002 | Chiu et al. | .................... | 345/864 |
| 2003/0234772 A1 * | 12/2003 | Zhang et al. | .................. | 345/177 |
| 2004/0229195 A1 | 11/2004 | Marggraff et al. | | |
| 2005/0275638 A1 * | 12/2005 | Kolmykov-Zotov et al. | . | 345/179 |
| 2006/0033725 A1 | 2/2006 | Marggraff et al. | | |
| 2006/0066591 A1 | 3/2006 | Marggraff et al. | | |
| 2006/0067576 A1 | 3/2006 | Marggraff et al. | | |

(Continued)

FOREIGN PATENT DOCUMENTS

WO WO 2007/141204 A1 12/2007

OTHER PUBLICATIONS

PCT International Search Report and Written Opinion, PCT/US2008/065163, Sep. 15, 2008, 9 Pages.

*Primary Examiner* — David T Welch
(74) *Attorney, Agent, or Firm* — Fenwick & West LLP

(57) ABSTRACT

In a pen-based computing system, a microphone on the smart pen device records audio to produce audio data and a gesture capture system on the smart pen device records writing gestures to produce writing gesture data. Both the audio data and the writing gesture data include a time component. The audio data and writing gesture data are combined or synchronized according to their time components to create audio ink data. The audio ink data can be uploaded to a computer system attached to the smart pen device and displayed to a user through a user interface. The user makes a selection in the user interface to play the audio ink data, and the audio ink data is played back by animated the captured writing gestures and playing the recorded audio in synchronization.

19 Claims, 4 Drawing Sheets

U.S. PATENT DOCUMENTS

| | | |
|---|---|---|
| 2006/0067577 A1 | 3/2006 | Marggraff et al. |
| 2006/0077184 A1 | 4/2006 | Marggraff et al. |
| 2006/0078866 A1 | 4/2006 | Marggraff et al. |
| 2006/0080608 A1 | 4/2006 | Marggraff et al. |
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0292543 A1 | 12/2006 | Marggraff et al. |
| 2007/0011140 A1 | 1/2007 | King et al. |
| 2007/0097100 A1 | 5/2007 | Marggraff et al. |
| 2007/0246539 A1* | 10/2007 | Sandstrom et al. ...... 235/472.01 |
| 2007/0280627 A1 | 12/2007 | Marggraff et al. |
| 2008/0129711 A1* | 6/2008 | Bergstrom et al. ........... 345/179 |

* cited by examiner

ANIMATION OF AUDIO INK

CROSS REFERENCE TO RELATED APPLICATIONS

This application claims the benefit of U.S. Provisional Application No. 60/940,667, filed May 29, 2007, which is incorporated by reference in its entirety.

BACKGROUND

This invention relates generally to pen-based computing systems, and more particularly to synchronizing recorded writing and audio.

When trying to absorb a large amount of information delivered orally and possibly visually, such as in a business meeting or classroom setting, people commonly take notes. A good set of notes can be used to review the information presented in a meeting and to refresh the note taker's memory. People often study from their notes, such as notes taken in a classroom. However, once disembodied from the oral presentation in which they were taken, even good notes lose much of their meaning because the context for the notes has been lost.

For this reason, people often record a presentation as well as take notes, and some systems automate this by pairing a recording while a user takes notes. But without a good interface to review the notes while playing back the audio, the additional context that the audio provides the notes has minimal benefit. For example, existing playback methods that merely provide line by line playback of the audio and do not show the progress of the audio in connection with the notes that were taken are suboptimal.

Accordingly, there is a need for techniques that can more effectively present writing coupled with audio in an effective user interface.

SUMMARY

Embodiments of the invention provide a system, method, and computer program product for capturing and displaying writing and audio using a smart pen device. A microphone on the smart pen device, or external microphones including binaural microphones worn by the user, records audio to produce audio data and a gesture capture system on the smart pen device records writing gestures to produce writing gesture data. Both the audio data and the writing gesture data include a time component. The audio data and writing gesture data are combined or synchronized according to their time components to create audio ink data. The audio ink data may be uploaded to a computer system attached to the smart pen device and displayed to a user through a user interface. The audio ink data may also be uploaded from a display device such as an e-ink screen overlaid with an Anoto dot pattern if the writing gesture data was captured by the device. The user makes a selection in the user interface to play the audio ink data, and the audio ink data is played back by animating the recorded writing gestures and playing the recorded audio in synchronization.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
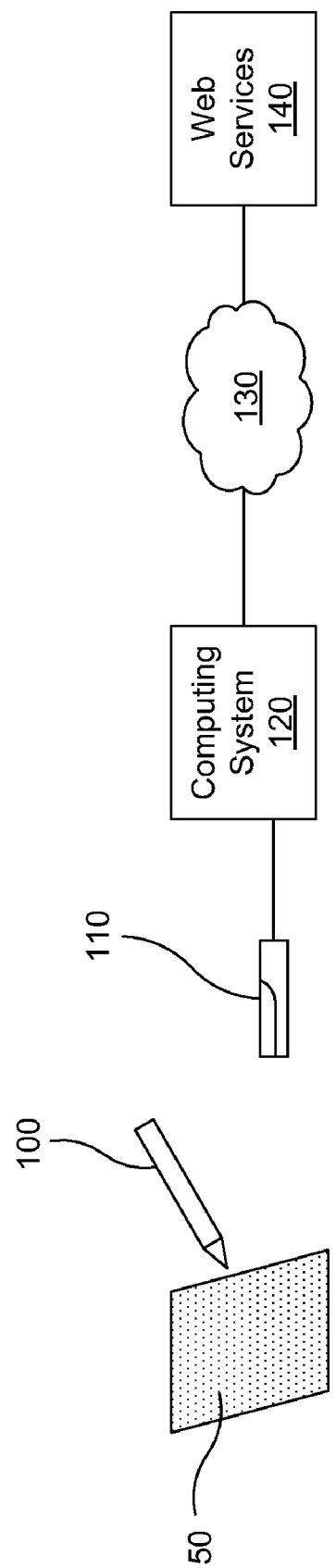
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
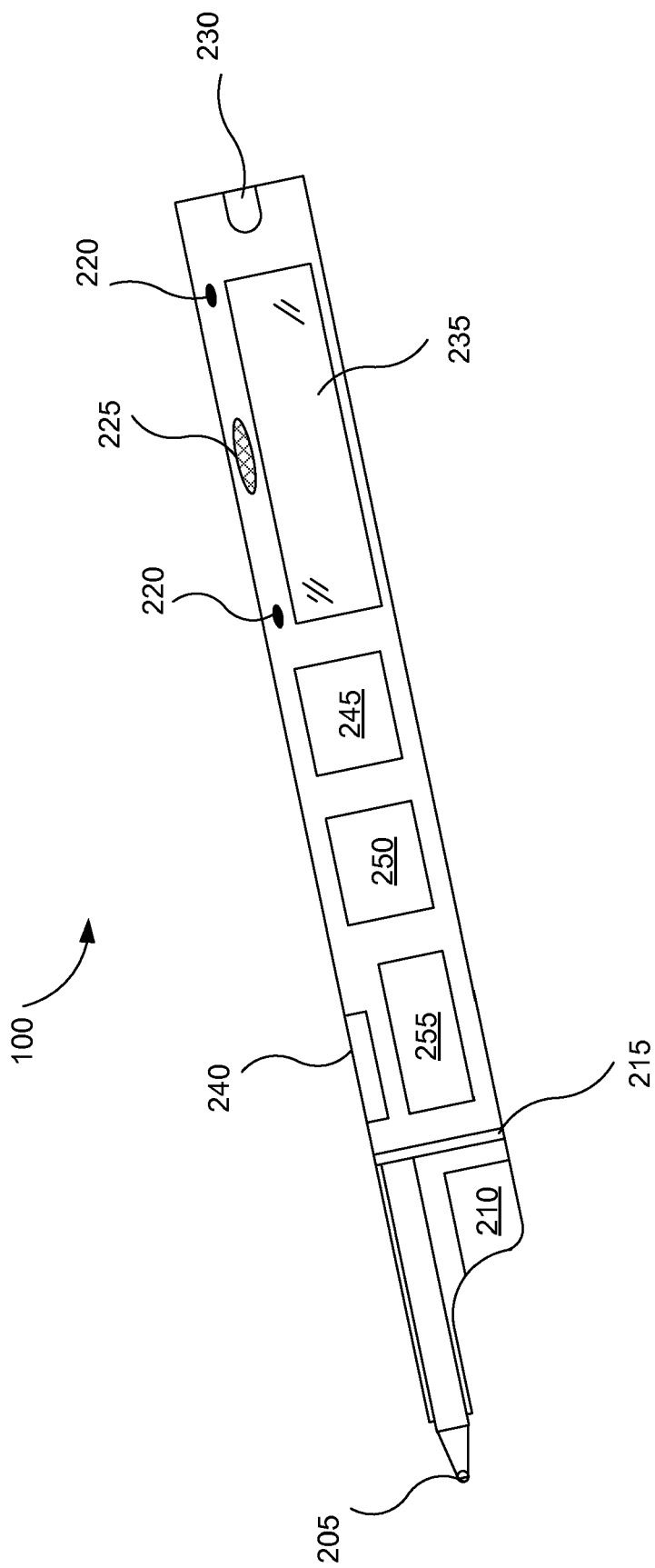
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Audio Ink

Embodiments of the invention provide an interface for reviewing notes coupled with recorded audio, herein referred to as "audio ink." To create the audio ink, writing and audio are captured and synchronized according to how they were originally presented, using any of a variety of techniques. A page of notes taken on a writing surface 50 using a smart pen 100 may contain both audio ink and non-audio ink, where non-audio ink is simply writing with no associated audio content. A user interface according to various embodiments of the invention can be used to view the captured audio and non-audio ink electronically. In one embodiment, the user interface is provided by the computing system 120. The interface includes a display for showing the audio and non-audio ink as well as controls for playing the audio associated with the audio ink.

In an example use of the interface, a user opens a page of notes that contains both audio and non-audio ink. The interface initially shows the non-audio ink on the page as static writing. In one embodiment, the interface also shows the audio ink, presented in a first color (e.g., light blue). When the user selects the play function from the controls in the interface, the interface begins to play the recorded audio associated with the audio ink. The interface also changes the color of the audio ink to a second color (e.g., dark blue) as the audio content is played, where the change of color of the audio ink coincides with the writing that was captured when the audio was initially recorded. In this way, the interface shows all of the notes, and also effectively conveys what was being written when the notes were taken, providing extremely useful context information about the notes. In an alternative embodiment, the audio ink is not displayed at all until the audio associated therewith is played back, thereby recreating the actual note taking experience.

The basic features of an embodiment of the interface for playing back audio ink, as well as various alternatives and other features, are described in more detail below.

Content of the Notes

As mentioned above, a page of notes may include both audio ink and non-audio ink, either of which can be captured, e.g., by a smart pen 100. The non-audio ink may merely comprise static writing or drawing, which may be captured by any means appropriate for the given application. Audio ink, in contrast, includes a time component, which allows for synchronization with recorded audio. The audio can be recorded using the microphone 220 of the smart pen while notes are being taken with the marker 205 of the smart pen. In one embodiment, the audio ink comprises a series of writing samples in time (e.g., using x, y, t coordinates) that is paired with an associated audio, which is linked to the writing samples in time. However, other data formats are possible for the audio ink.

Viewing and Controlling Playback of the Animation

Figure 3:
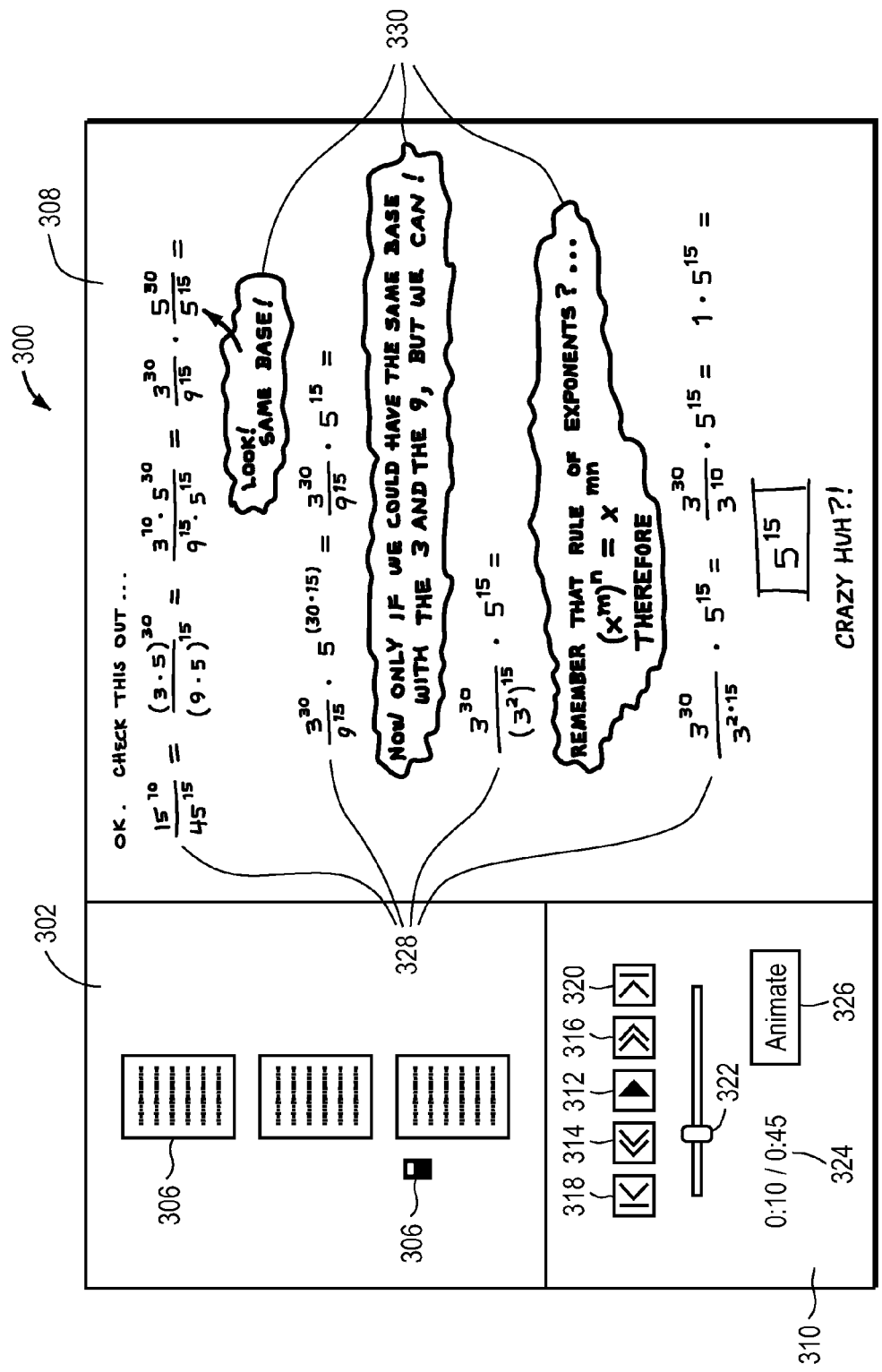
FIG. 3 illustrates an example interface in the smart pen management software for playing back audio ink, in accordance with an embodiment of the invention.

However obtained, a page of notes including audio ink may be viewed in a desktop environment on a computing system 120 such as a personal computer, a cellular phone, a PDA, or any other device having an ability to display notes and play back associated audio. In a desktop environment, a page of notes including audio ink may be viewed using smart pen management software including a viewer application. FIG. 3 illustrates an example interface 300 in the smart pen management software for playing back audio ink, in accordance with one embodiment of the invention.

As illustrated in the FIG. 3, a user may navigate a number of pages 306 of notes in a navigation pane 302. Some pages 306 may include audio ink that can be played back using the interface 300. Such a page 306 of notes with audio ink enables a "paper replay session," in which at least a portion of the writing on the page 306 can be animated in connection with an audio recording. A user may click on a page 306 with audio ink to open a paper replay session.

The main viewing window 308 in the example interface 300 includes a reproduction of the notes, below which is presented a control bar 310. The control bar 310 may include a number of audio controls for controlling the playback of the audio ink. Button 312 toggles between play and pause of the audio ink playback. For example, buttons 314 and 316 rewind and fast forward the digital ink playback. Buttons 318 and 320 move to the previous and the next bookmarks, where a bookmark is a location previously defined by the user. Indicator 322 gives the position of the current audio ink playback. Display 324 gives the elapsed and total time of the current audio ink playback. Button 326 activates the animation of the audio ink (e.g., controls whether the color of the ink changes during playback). It can be appreciated that these are example of a set of controls, and various other controls may be used in other embodiments.

Initially, before playback of any audio ink, the viewer application shows the non-audio ink 328. In this example, the non-audio ink is the math equations and does not include the notes written between the lines of math equations inside "clouds" on the page. In one embodiment, these notes are the audio ink 330 and are illustrated in a different color than the non-audio ink, thereby indicating the availability of audio connected to the writing. In FIG. 3, the non-audio ink 328 is illustrated in a lighter shade than the audio ink 330. A user may use the audio control bar 310 to initiate playback of the audio connected to the audio ink. The user can also select a particular segment of the audio ink 330, for example by clicking on it with an input pointing device of the computing system 120, to initiate playback of the audio connected to the audio ink. In one embodiment, a user can skip to a particular location in time corresponding to a segment of the audio ink by selecting that segment. In this way, a user need not be tied to a linear playback of the note taking session.

Figure 4:
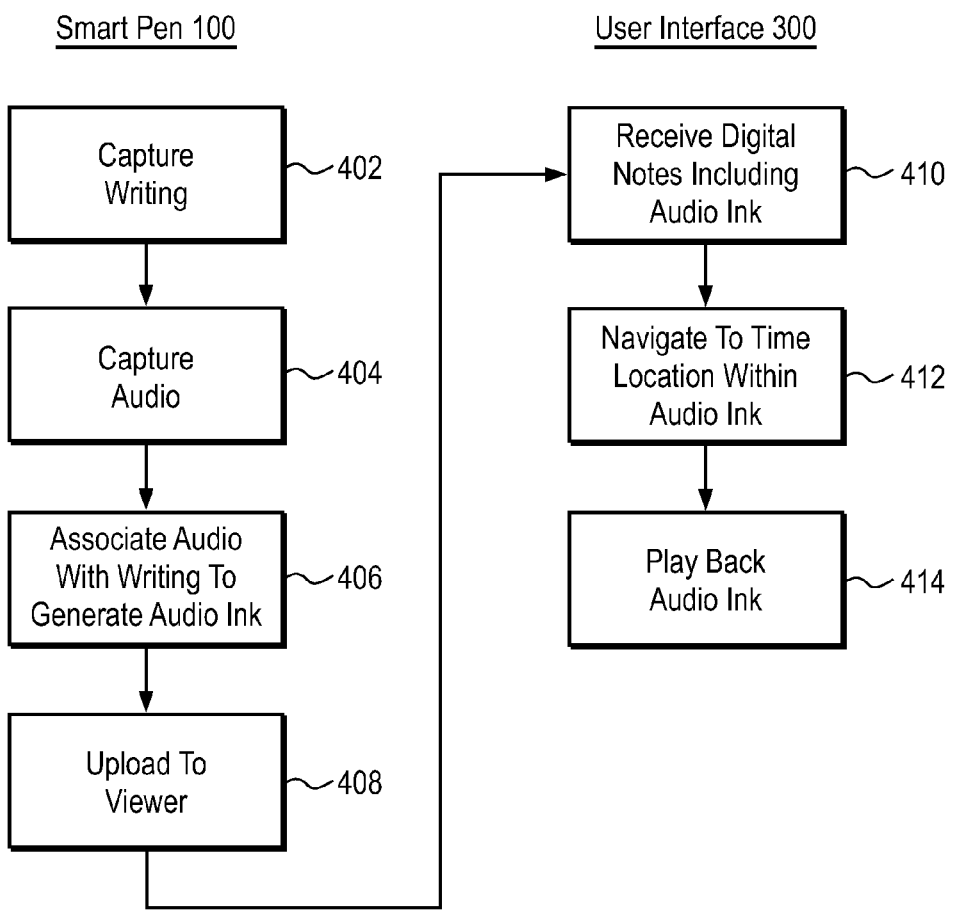
FIG. 4 illustrates a method for capturing and displaying writing and audio, in accordance with an embodiment of the invention.

FIG. 4 illustrates a method for capturing and displaying writing and audio, according to one embodiment. A smart pen 100 captures 402 writing using an imaging system 210 and captures 404 audio using a microphone 220. Both the writing and the audio include a time component. The audio is associated 406 with the writing to generate audio ink. The audio ink is uploaded 408 to a viewer, such as an external computing system 120 for later playback. A user interface 300 on the computing system 120 receives 410 digital notes including the audio ink generated on the smart pen. A user of the user interface 300 issues a command to navigate 412 to a time location within the audio ink. The user interface 300 then plays 414 back the audio ink starting at the time location.

Additional Features for Playback of Audio Ink

Other features of message creation that are possible within the scope of various embodiments of the invention may include one or more of the following.

In one embodiment, the smart pen management software includes a feature that allows for the searching of audio that is attached to the notes. In one implementation, the user may input a search term, such as a word or phrase, by typing and/or speaking the search term. The software then uses an audio search engine (which are known in the art) to match the search term against the audio content associated with the notes. The software may then present the user with a list of results, which are indexed to the audio ink. In this way, a user can search for notes based on just on the content of the notes, but also on what was being said when the notes where taken. In another implementation, the audio content is already transcribed (or transcribed on the fly), using an automated system or manually, and the a textual search term is simply matched against the transcription. If the transcription is indexed in time or otherwise matched to the notes, the software may similarly allow the user to search for notes based on the audio content associated therewith.

In one embodiment, the color of the audio ink 330 changes as the audio associated with it is played. For example, the color of the audio ink may turn from a light blue to a dark blue. This allows the user to see all of the notes, but it also provides the user with the valuable contextual information about what notes were being taken when the audio was initially heard by the note taker. This can be especially useful when a user adds notes on the page in a non-linear way. For example, after the full page of notes was taken, the lecturer may have made an observation about the first line of notes, causing the note taker to write the comment: "Look! Same Base!" Without the synchronization of the audio with the animated ink, a viewer may lose his or her place and not realize that the audio was meant to refer to the first line of equations. But with the animated audio ink, the user can readily see that the note taker added the note with a given portion of audio. In this way, the understanding of the note taker is better imparted to the subsequent viewer of the notes. In one embodiment, different colors are assigned to audio ink corresponding to audio from different speakers. This assignment is made manually while notes are being taken, manually after the notes have been taken, or automatically using voice analysis software, for example.

In one embodiment, however the audio file is navigated, the appearance of the ink immediately "catches up" to the current playback position of the audio. Audio navigation options may include, for example, (1) jump forward five seconds (or some other interval); (2) jump backwards five seconds (or some other interval); (3) jump to next bookmark (where a bookmark is a location previously marked by a user); (4) jump to previous bookmark; and (5) jump to any relative position within the entire recording session (which may be invoked via the indicator bar 322, where the user taps anywhere in the bar to jump, e.g., tapping in the middle of the bar jumps to the middle of the audio session, which would be minute 12:15 in a session that is 24:30 long in total, or would be minute 2:05 in a session that is 4:10 long in total, or tapping at other points along the bar similarly jumps to that same relative percentage of completion of the audio file).

In one embodiment, when the user navigates the audio in any of these ways, the appearance of the ink may change to match the new playback position of the audio. For example, if the user starts an audio file that is one hour in duration, and listens to the first 30 seconds, probably only a small amount of the audio ink 330 on the page will have changed color because only a small amount of the total ink was written within the first 30 seconds of the recording. If the user then taps the position bar close to the right edge, at a position representing 95% of the total session, the audio playback will jump to very late in the audio file, and suddenly most of the ink on the page will change color because the page has been updated to represent the point in time close to the end of the recording session.

In one embodiment, during a single recording session, notes may be made on multiple pages, or even on a variety of paper types (e.g., notebook pages, sticky notes, index cards, and loose leaf pages). In the example shown in the figure, thumbnails of all the pages 306 associated with the current audio session are displayed in the navigation pane 302. Clicking on any of the thumbnails will cause that page to be displayed at full size in the main viewing window 308. An icon 304 appears next to one of the thumbnails to indicate the page that contains the ink associated with the most recent index into the audio. This helps the viewer to keep track of the current point in the ongoing animation. If the user clicks on the thumbnail that bears the icon, they will be able to see the page where ink is currently animating. A setting may be included in the application that allows the user to decide whether the page displayed in the main viewing area should automatically switch to the page containing the current or most-recent index point for the audio currently playing. If the display is not set to automatically update, this icon may be helpful in allowing the user to find the place in their notes that is most relevant to the audio being played.

In one embodiment, while ink (i.e., written content) can be added to the page while the recording is being made, as described above, audio ink 330 can also be added during playback of the audio file. Ink added at this time is also indexed to a point in the audio file. In this case, rather than being indexed to the present moment in time, it is indexed to the moment represented by the current playback position of the audio file. For example, if a lecture is recorded on Wednesday from 2 pm to 3 pm, and a student makes a mark on the page at 2:15 pm, when a user later taps on that mark on the page, the audio jumps to what was being recorded at 2:15 pm on Wednesday. On Friday, the student then reviews the notes and taps on a mark on the page. The lecture continues to play back. At 10:00 am on Friday, the student is listening to the part of the lecture that occurred at 2:30 pm on Wednesday, and makes a note on the page. (The note can actually be made on any dot-enabled page; it can be but does not need to be on the same writing surface 50 on which the notes were originally written.) This note, even though it was written at 10 am on Friday, is indexed to the recorded audio from 2:30 pm on Wednesday. When the user later goes back and taps that mark on the page, the audio begins playing back from the point of the lecture that occurred at 2:30 pm on Wednesday. In this way, any number of index points can be added after-the-fact. In an extreme case, a hundred different pages could contain ink that is indexed to a five-minute span of an audio recording. This greatly increases the non-linear possibilities of the notes.

In one embodiment, ink animation occurs at the time, and in the order, of the point in the audio file to which the ink is indexed. Therefore, audio ink 330 written at very different times may animate consecutively if they are indexed to proximal points within the audio recording. In some cases, two different areas of ink may in fact animate at the same time, if both areas were written during the playback of the same point in the audio recording. Audio ink 330 that is added to the page subsequent to the recording may be selectively displayed by the user. For example, an option may be provided in interface 300 for displaying or hiding subsequently added audio ink. The option may also allow subsequently added audio ink to be displayed in a different color than audio ink added during the initial recording.

In another embodiment, the system includes the ability to add audio ink 330 that is indexed to the recording, not just while the audio is playing back, but also while playback is paused. This feature allows a series of ink marks to be indexed to a single point in time within the audio recording. When ink marks are added during the recording or playback process, the resulting animation shows a smooth addition of ink as the audio playback proceeds. But if ink marks are added during paused audio, then the resulting animation will show a sudden addition of a quantity of ink marks all at the same time. For example, instead of an animation that shows ink appearing on the screen at the normal speed of writing, an entire paragraph of writing, or a drawing of a chart or graphic, might suddenly appear on the page.

In one embodiment, the smart pen 100 includes a control mechanism to allow a user to erase written content that has been captured by the device. This control to erase may be defined by the user (e.g., by drawing a "delete" button and assigning that functionality thereto), predefined as a menu item accessible by the device, or invoked via some other means. In one implementation, after a user has been writing with the smart pen, the user invokes the erase functionality and then defines the region of written content to be erased (e.g., by tapping opposite corners of an erase box, circling the content to be deleted, or via some other input). The smart pen then deletes the selected written content from its memory 250 or otherwise marks it not to be included with the captured content, e.g., when the smart pen is docked.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A pen-based computing system for capturing and displaying writing and audio, the system comprising:
   a smart pen device comprising:
      a microphone configured to record audio and produce audio data based thereon, the audio data including a time component,
      a gesture capture system configured to capture writing gestures and produce writing gesture data based thereon, the writing gesture data including a capture timing relative to a time component;
      a processor,
      a storage medium,
      instructions contained on the storage medium and capable of being executed by the processor, the instructions for combining the audio data and the writing gesture data according to the time components thereof to generate audio ink data, and
      an interface for uploading the audio ink data to a computer system; and
   a computer program product for playing back the audio ink data on the computer system, the computer program product comprising a computer-readable storage medium containing computer program code for:
      receiving a selection to play the audio ink data in a user interface of the computing system;
      displaying the captured writing gesture data in a first color; and
      playing back the audio ink data by animating the captured writing gestures over time and playing the recorded audio in synchronization with the animating of the captured writing gestures, the animating comprising changing the writing gesture data from the first color to a second color using a playback timing that corresponds to the capture timing of the writing gestures when originally captured, wherein the writing gestures captured prior to a current playback time are displayed in the second color and writing gestures captured after the current playback time are displayed in the first color.

2. The pen-based computing system of claim 1, wherein the selection further comprises a selection of a segment of displayed writing gesture data corresponding to the audio ink data.

3. The pen-based computing system of claim 1, wherein the writing gesture data is stored on the storage medium of the smart pen device.

4. The pen-based computing system of claim 1, wherein the selection further comprises a selection of a particular time in the recorded audio.

5. The pen-based computing system of claim 1, wherein the computer-readable storage medium further comprises computer program code for:
   pausing playback of the audio ink data at a particular time in the recorded audio;

receiving additional writing gestures; and
inserting the additional writing gestures into the audio ink data, the additional writing gestures corresponding to the particular time in the recorded audio.

6. A computer program product for displaying writing and playing audio recorded using a smart pen, the computer program product comprising a non-transitory computer-readable storage medium containing computer program code for:
receiving audio ink data from a smart pen, the audio ink data comprising audio recorded by the smart pen and writing gestures captured by the smart pen according to a capture timing, the writing gestures and audio synchronized in time;
receiving a selection to play the audio ink data in a user interface of a computing system;
displaying the captured writing gesture data in a first color; and
playing back the audio ink data by animating the captured writing gestures over time and playing the recorded audio in synchronization with the animating of the captured writing gestures, the animating comprising changing the writing gesture data from the first color to a second color using a playback timing that corresponds to the capture timing of the writing gestures when originally captured, wherein the writing gestures captured prior to a current playback time are displayed in the second color and writing gestures captured after the current playback time are displayed in the first color.

7. The computer program product of claim 6, wherein the selection further comprises a selection of a segment of displayed writing gesture data corresponding to the audio ink data.

8. The computer program product of claim 6, wherein the computer-readable storage medium further comprises computer program code for:
receiving non-audio ink data from the smart pen, the non-audio ink data comprising writing gestures captured by the smart pen, the writing gestures not synchronized with the audio recorded by the smart pen; and
displaying the writing gestures of the non-audio ink data on a page containing the writing gestures of the audio ink data.

9. The computer program product of claim 6, wherein the selection further comprises a selection of a particular time in the recorded audio.

10. The computer program product of claim 9, wherein playing back the audio ink data further comprises navigating to the particular time within the audio ink and animating the captured writing gestures starting at the particular time.

11. The computer program product of claim 6, wherein the computer-readable storage medium further comprises computer program code for:
receiving a search term;
searching the recorded audio for the search term; and
playing back a portion of the recorded audio containing the search term and animating the captured writing gestures corresponding to the portion of the recorded audio.

12. The computer program product of claim 6, wherein the computer-readable storage medium further comprises computer program code for:
pausing playback of the audio ink data at a particular time in the recorded audio;
receiving additional writing gestures; and
inserting the additional writing gestures into the audio ink data, the additional writing gestures corresponding to the particular time in the recorded audio.

13. The computer program product of claim 12, wherein the computer-readable storage medium further comprises computer program code for:
receiving a selection for displaying the additional writing gestures in a different color or for hiding the additional writing gestures.

14. The computer program product of claim 6, wherein animating the captured writing gestures and playing the recorded audio in synchronization further comprises:
displaying a portion of the writing gestures in a speaker color, the speaker color based on an identity of a speaker of a portion of the recorded audio corresponding to the portion of the writing gestures.

15. A method for displaying writing and audio recorded using a smart pen comprising:
receiving audio ink data from a smart pen, the audio ink data comprising audio recorded by the smart pen and writing gestures captured by the smart pen according to a capture timing, the writing gestures and audio synchronized in time;
displaying a paper replay interface for controlling playback of the audio ink;
displaying the captured writing gesture data in a first color;
receiving a selection of a play button in the paper replay interface; and
playing back the audio ink data by animating the captured writing gestures over time and playing the recorded audio in synchronization with the animating of the captured writing gestures, the animating comprising changing the writing gesture data from the first color to a second color using a playback timing that corresponds to the capture timing of the writing gestures when originally captured, wherein the writing gestures captured prior to a current playback time are displayed in the second color and writing gestures captured after the current playback time are displayed in the first color.

16. The method of claim 15, further comprising:
receiving non-audio ink data from the smart pen, the non-audio ink data comprising writing gestures captured by the smart pen not synchronized with the audio;
displaying a representation of the non-audio ink data in the paper replay interface before playback of the audio ink data, wherein the representation comprises a third color different than the first and second colors.

17. The method of claim 15, further comprising:
displaying a previous bookmark button in the paper replay interface, wherein selection of the previous bookmark button jumps the playback of the audio ink to a prior time location previously defined by a user; and
displaying a next bookmark button in the paper replay interface, wherein selection of the next bookmark button jumps the playback of the audio ink to a subsequent time location previously defined by the user.

18. The method of claim 15, further comprising:
receiving a selection of a particular segment of the audio ink data using a pointing device; and
automatically skipping playback of the audio ink to a location in time corresponding to the selected segment of the audio ink data.

19. The method of claim 15, further comprising:
receiving selection of a time location in the audio ink; and
displaying the writing gesture data captured prior to the time location in the second color, and displaying the writing gesture data captured after the time location in the first color.

* * * * *